United States Patent [19]

Anfindsen

[11] Patent Number: 5,326,033
[45] Date of Patent: Jul. 5, 1994

[54] ADJUSTABLE CONTROL VALVE FOR FLOW REGULATION OF GAS OR LIQUID AND USE OF SUCH VALVE

[76] Inventor: Ole A. Anfindsen, P.O. Box 30, N-4301, Sandnes, Norway

[21] Appl. No.: 949,510
[22] PCT Filed: May 24, 1991
[86] PCT No.: PCT/NO91/00078
 § 371 Date: Nov. 25, 1992
 § 102(e) Date: Nov. 25, 1992
[87] PCT Pub. No.: WO91/19124
 PCT Pub. Date: Dec. 12, 1991

[30] Foreign Application Priority Data

May 25, 1990 [NO] Norway .................. 902308

[51] Int. Cl.$^5$ .................. F16K 7/07; B05B 1/30
[52] U.S. Cl. .................. 239/61; 239/300; 239/581.1; 239/586; 251/6; 251/9
[58] Field of Search .................. 239/11, 61, 300, 413, 239/417.5, 569, 581.1, 586; 251/6, 7, 9; 222/214

[56] References Cited

U.S. PATENT DOCUMENTS

| | | | |
|---|---|---|---|
| 2,348,402 | 5/1944 | Miller | 251/9 X |
| 2,931,387 | 4/1960 | Fleming | 251/9 X |
| 3,105,745 | 10/1963 | Vieli | 239/417.5 X |
| 3,403,820 | 10/1968 | Landis et al. | 251/9 X |
| 3,511,468 | 5/1970 | Young . | |
| 3,857,511 | 12/1974 | Govindan | 239/11 |
| 4,286,755 | 9/1981 | Shipman | 239/586 X |
| 4,372,345 | 2/1983 | Mehus | 251/9 X |
| 4,397,642 | 8/1983 | Lamadrid | 251/9 X |
| 4,786,028 | 11/1988 | Hammond . | |
| 4,961,536 | 10/1990 | Correard | 239/300 X |

FOREIGN PATENT DOCUMENTS

| | | |
|---|---|---|
| 0013703 | 8/1980 | European Pat. Off. . |
| 3113762 | 10/1982 | Fed. Rep. of Germany ...... 239/569 |
| 1358478 | 3/1964 | France . |
| 1141883 | 2/1969 | United Kingdom .................. 251/9 |
| 2167320 | 5/1986 | United Kingdom .................. 239/61 |
| 2187535 | 9/1987 | United Kingdom .................. 239/586 |

*Primary Examiner*—Andres Kashnikow
*Assistant Examiner*—William Grant
*Attorney, Agent, or Firm*—Bacon & Thomas

[57] ABSTRACT

An adjustable control valve for flow regulation of gas or liquid includes a controlled hose clamp device, preferably with two clamping members disposed on respective sides of a hose for adjustable compression of the hose and thereby setting of the flow cross-section of the hose at a compression site between the clamping members. The control valve comprises further a movable cam disk, e.g. a rotatable eccentric sheave actuated by a shifting mechanism, preferably a step motor, disposed for variable compression of the hose in accordance with the position of the cam disk or eccentric sheave. For automatically controlled setting of the flow cross-section of the hose, the shifting mechanism may be arranged to be controlled from a measuring device mounted for gauging the flow in the hose downstream of the compression site (As). In practice such regulation may be used for controlling the quantity ratios between the supplies of paint, jet formation air and atomizing air, respectively, to an atomizing gun, preferably by a common data processing unit inserted between the control valves and measuring device(s) in all control loops for the supplies of paint, jet formation air and atomizing air to the spray gun.

14 Claims, 1 Drawing Sheet

ADJUSTABLE CONTROL VALVE FOR FLOW REGULATION OF GAS OR LIQUID AND USE OF SUCH VALVE

BACKGROUND OF THE INVENTION

The present invention is related to an adjustable control valve flow regulation of gas or liquid, in particular for use in controlling the quantity of paint and air supplied during a spray painting operation.

Control of paint quantity and air supply for atomizing and jet formation with manual as well as robot controlled spray painting has up to now usually been performed by means of air pressure regulated mechanical controllers. Regarding the paint quantity control, these controllers have the disadvantage that they are substantially temperature and viscosity dependent and thus require cost and energy demanding regulation of the prevailing conditions in the spray boxes and paint flow circulation.

Another disadvantage of the known technical equipment is the difficulty associated with the cleaning thereof when the color of the paint is to be changed.

SUMMARY OF THE INVENTION

Consequently, it is an object of the present invention to provide an adjustable control valve in which the disadvantages indicated above are essentially overcome.

Thus, the invention concerns an adjustable control valve for flow regulation of gas or liquid by compressing a hose at a site between two clamping members of a hose clamp device, thereby adjusting selectively the flow cross-section of the hose, one of the clamping members being operatively disposed in engagement with a movable cam disk, e.g. a rotatable eccentric sheave, operated by a shifting mechanism and mounted for actuating the clamp device to exert varying compression of the hose in accordance with the setting of the cam disk or eccentric sheave. On this background of prior art known in principle from GB-A-2.187.535 for a different field of application, the unique feature of the control valve according to the invention is then that said clamping member in engagement with the cam disk or eccentric sheave is disposed on a pivot arm which is pivotably hinged on a pivot pin substantially spaced from the compression site.

When used for the supply of paint for spray painting, this technical solution has the advantage that no mechanical valve parts are in contact with the flow of liquid, and cleaning in connection with changing of the paint is simplified and devoid of problems. It should also be clearly evident that this solution would have corresponding advantages in many other cases.

The engagement of the clamping member with the eccentric sheave is preferably effected through a ball or roll bearing, and the shifting mechanism is preferably a step motor having the eccentric sheave mounted on the motor shaft, and may advantageously be arranged to be controlled by a flow measuring device provided for gauging the flow in the hose downstream of the compression site.

The cam disk or eccentric sheave has preferably a cam profile shaped to provide a linear relation between the shift position or rotational angle of the cam and the flow cross-section of the hose at the compression site, but alternatively a data processing unit may be inserted in the controlling connection between the flow measuring device and the shifting mechanism and programmed to provide a linear relation between the shift position or rotational angle of the cam and the flow cross-section of the hose at the compression site.

The invention is also related to use of one or more adjustable control valves as indicated above, for the control of the supply of paint and/or air to an atomizing gun for spray painting, preferably for the purpose of controlling the quantity ratios between the supplies of paint, jet formation air and atomizing air, respectively, to the gun.

In practice such a quality ratio control is preferably performed by means of a common data processing unit connected between the control valve and the measuring device in all control loops for the supplies of paint, jet formation air and atomizing air, respectively, to the atomizing gun.

BRIEF DESCRIPTION OF THE DRAWINGS

The invention is now to be explained in more detail by means of exemplified embodiments with reference to the accompanying drawings, whereon.

DETAILED DESCRIPTION OF THE PREFERRED EMBODIMENT

Figure 1:
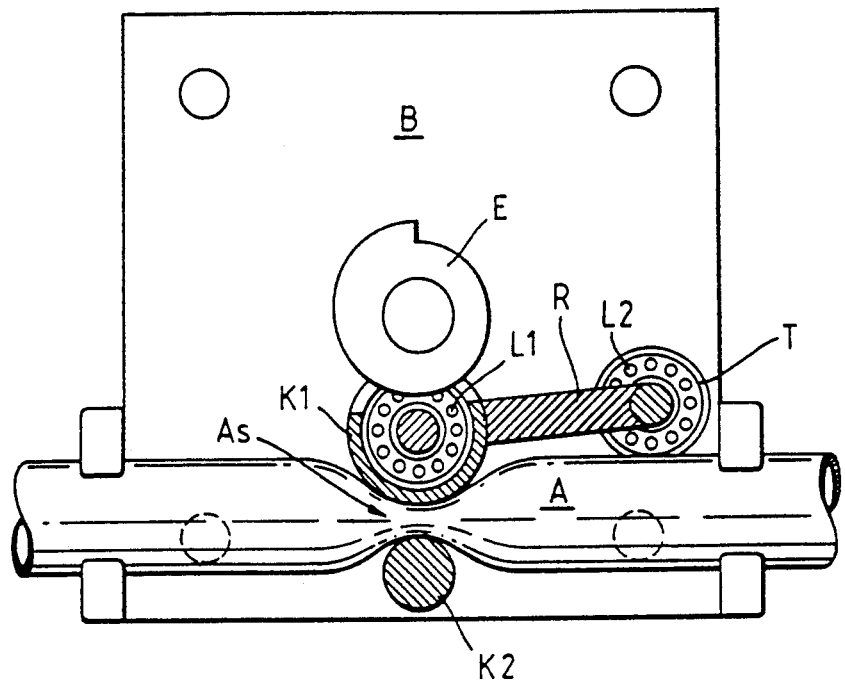
FIG. 1 shows schematically a control valve according to the invention in a side view.

In FIG. 1 it is shown a preferred embodiment of the present invention, in which a hose clamping device K1, K2 is mounted on a supporting plate B for controlled clamping of a hose A, through which flows a gas or liquid, at a compression site As. The hose clamp device comprises two cylindrical clamping members on respective sides of the hose at the compression site. One of the clamping members K1 is disposed on a pivot arm R, which is pivotably hinged on a pivot pin T spaced from the compression site As, whereas the other clamping member K2 is stationary mounted on the bottom side of the hose directly opposite the above mentioned, pivotably movable clamping member K1. Clamping member K1 is in engagement with an eccentric sheave E via a ball bearing L1, which is mounted in the interior of the clamping member K1 and extends outside towards the eccentric sheave E through an opening on the top side of the clamping member K1. In this way, a friction and hose wearing sliding motion between the clamping member and the hose is generally avoided, as well as between the clamping member and the eccentric sheave.

The eccentric sheave E is mounted on the shaft of a step motor (not shown) serving as a shift mechanism for the setting of the eccentric sheave E in various angular positions with respect to the top clamping member K1. In accordance with the rotational angular setting, the external cam profile of the eccentric sheave would then move the clamping member K1 through the ball bearing to a greater or smaller extent in a direction towards the lower clamping member K2, the clamping member K1 by means of the pivot arm R being pivoted about its pivot pin T, which in turn is supported in a ball or roll bearing L2.

By means of the setting mechanism, which in the present case is constituted by a step motor, and the cam profile of the eccentric sheave, the distance between the clamping members K1, K2 at the compression site As of the hose may be selectively varied in accordance with the rotational position of the eccentric sheave E. In this manner the flow cross-section of the hose may be adjusted to the desired value for flow regulation of the gas or liquid which passes through the hose A. The flow regulation may then in practice be performed automatically in closed loop by controlling the step motor from a measuring device mounted for gauging the liquid or gas flow in the hose downstream of the compression site As.

Figure 2:
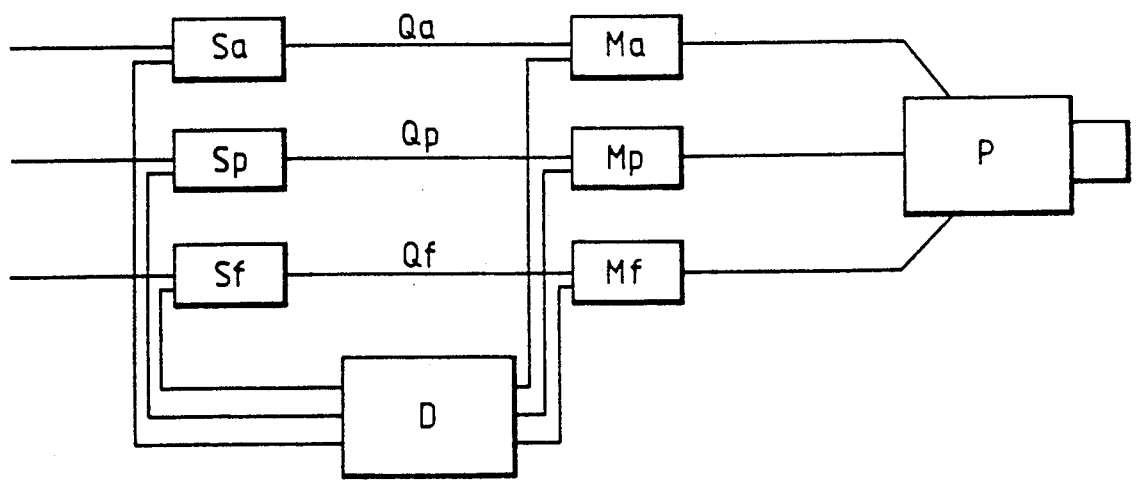
FIG. 2 shows in principle a circuit diagram for use of the control valve according to the invention in installations for the supply of paint, atomizing air and jet formation air in controlled mutual quantity ratios to an atomizing gun.

A practical embodiment of such a favorable regulation is illustrated in FIG. 2, where control valves according to the invention are shown included in equipment for the controlled supply of paint, atomizing air and jet formation air to an atomizing gun for spray painting. Three control valves Sa, Sp, Sf are connected into individually associated supply channels Qa, Qp and Qf for the supply of atomizing air, spray paint and jet formation air, respectively, to the painting gun P. Downstream of the control valves a measuring element, Ma, Mp and Mf respectively, is included in each of the supply channels Qa, Qp and Qf respectively, for gauging the flow value of gas or liquid in the respective channels. The values gauged by the measuring elements are fed back as analog adjusting signals to the individually associated shifting mechanisms of the respective control valves Sa, Sp and Sf. As shown in FIG. 2, all feedbacks of adjusting analog signals take place through a computer D, which is programmed for regulating the quantity ratios between the supplies of paint, jet formation air and atomizing air to the spray gun in accordance with the painting to be performed. The computer may in addition also be programmed for providing a linear relation between the angular position of the eccentric sheave and the flow cross-section of the hose at the compression site As. The last mentioned programmed control is, however, not necessary in cases wherein the eccentric sheave E has a calibrated cam profile which is empirically shaped to provide the desired linear relation between the angular position of the eccentric sheave and the flow cross-section of the hose at the compression site.

I claim:

1. An adjustable control valve for flow regulation of gas or liquid by compressing a hose at a site between two clamping members of a hose clamp device, thereby adjusting selectively the flow cross-section of the hose, one of said clamping members being operatively disposed in engagement with a movable cam disk operated by a shifting mechanism and mounted for actuating the clamp device to exert incrementally varying compression of said hose in accordance with the setting of the cam disk, wherein said one of the clamping members in engagement with the cam disk is disposed on a pivot arm, which is pivotably hinged on the pivot pin substantially spaced, along said hose, from said one of the clamping members.

2. The adjustable control valve as claimed in claim 1, wherein said engagement of said one of the clamping members with the cam disk is effected through a bearing which mounts said one of the clamping members to said pivot arm.

3. The adjustable control valve as claimed in claim 1, wherein the shifting mechanism is a step motor having said cam disk mounted on a shaft of the step motor.

4. The adjustable control valve as claimed in claim 1, further including flow measuring means mounted for gauging the flow in the hose downstream of the compression site and for controlling said shifting mechanism to control the flow in the hose.

5. The adjustable control valve as claimed in claim 4, further comprising a data processing unit inserted in a closed circuit controlling connection between the flow measuring means and the shifting mechanism and programmed to provide linear relation between the rotational angle of the cam disk and the flow cross-section of the hose at the compression site.

6. The adjustable control valve as claimed in claim 5, wherein said adjustable control valve is incorporated in an atomizing gun for spray painting, said atomizing gun incorporating a channel for supplying at least one paint, jet formation air and atomizing air thereto, said control valve being interposed in said channel.

7. The adjustable control valve as claimed in claim 1, wherein the cam disk has a cam profile shaped to provide a linear relation between a rotational angle of the cam disk and the flow cross-section of the hose at the compression site.

8. An adjustable control valve for regulating the flow of gas or liquid through a compressible hose comprising:
   a hose clamp device including a first, fixed clamping member and a second clamping member;
   means for mounting said second clamping member for incremental movement towards and away from said first clamping member such that a longitudinally extending hose positioned between said first and second clamping members can be variably compressed therebetween, said mounting means including a pivot arm having first and second ends, said second clamping member being mounted upon the first end of said pivot arm, the second end of said pivot arm being pivotally hinged by a pivot pin at a position longitudinally spaced from said second clamping member; and
   shifting means for pivoting said pivot arm so as to selectively move said second clamping member towards and away from said first clamping member, said shifting means comprising a cam element that is rotatably mounted adjacent to and in engagement with said second clamping member and means for rotating said cam element to selectively position said second clamping member relative to said first clamping member.

9. The adjustable control valve as claimed in claim 8, wherein said mounting means further comprises a bearing member carried by the first end of said pivot arm, said cam element directly engaging said bearing member to selectively position said second clamping member.

10. The adjustable control valve as claimed in claim 9, wherein said bearing member is mounted within said second clamping member, said second clamping member being provided with an opening through which said bearing member extends for engagement with said cam element.

11. The adjustable control valve as claimed in claim 2, wherein said shifting means further comprises a step motor that includes an output shaft upon which said cam element is mounted.

12. The adjustable control valve as claimed in claim 8, further including flow measuring means positioned downstream of said hose clamp device gauging a flow in a hose positioned between said first and second clamping members and for controlling said shifting means to vary the flow in the hose.

13. The adjustable control valve as claimed in claim 12, further comprising a data processing unit for receiving flow signals from said flow measuring means and for controlling said shifting means to vary the flow in a linear manner.

14. The adjustable control valve as claimed in claim 8, wherein the cam element includes a cam profile shaped to provide a linear relation between a rotational angle of the cam element and the distance between said first and second clamping members.

* * * * *